US012015728B2

(12) United States Patent
Kim et al.

(10) Patent No.: US 12,015,728 B2
(45) Date of Patent: Jun. 18, 2024

(54) ELECTRONIC DEVICE INCLUDING CAMERA MODULE

(71) Applicant: Samsung Electronics Co., Ltd., Suwon-si (KR)

(72) Inventors: Doyun Kim, Suwon-si (KR); Hokyung Kang, Suwon-si (KR); Dongwoo Lee, Suwon-si (KR); Jihyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 17/894,582

(22) Filed: Aug. 24, 2022

(65) Prior Publication Data

US 2022/0407951 A1    Dec. 22, 2022

Related U.S. Application Data

(63) Continuation of application No. PCT/KR2022/003402, filed on Mar. 11, 2022.

(30) Foreign Application Priority Data

Apr. 2, 2021    (KR) .......................... 10-2021-0043486

(51) Int. Cl.
*H04N 23/50*        (2023.01)
*H04M 1/02*         (2006.01)
(Continued)

(52) U.S. Cl.
CPC .......... *H04M 1/0264* (2013.01); *H04N 23/51* (2023.01); *H04N 23/54* (2023.01); *H04N 23/55* (2023.01); *H04N 23/675* (2023.01)

(58) Field of Classification Search
None
See application file for complete search history.

(56) References Cited

U.S. PATENT DOCUMENTS

| 10,222,577 B2 | 3/2019 | Murakami |
| 2016/0202494 A1* | 7/2016 | Seo ........................ G03B 29/00 359/557 |

(Continued)

FOREIGN PATENT DOCUMENTS

| CN | 204331242 U | 5/2015 |
| KR | 10-0333807 B1 | 8/2002 |

(Continued)

*Primary Examiner* — Twyler L Haskins
*Assistant Examiner* — Wesley J Chiu
(74) *Attorney, Agent, or Firm* — Jefferson IP Law, LLP

(57) ABSTRACT

An electronic device includes a camera module, wherein the camera module includes a lens assembly including lenses aligned along an optical axis, an actuator, a first magnet disposed on a first surface of the lens assembly, a first coil configured to move the lens assembly along the optical axis, a metal shield structure disposed on an outer surface of the actuator to face the first coil, and a fixing structure disposed on a third surface perpendicular to the first surface of the lens assembly, wherein at least a portion of the fixing structure has a magnetic property. When one end of the fixing structure is inserted into an opening of a housing, the fixing structure is fixed in an optical axis direction by the opening and is fixed in the first direction by a magnetic force acting on the metal shield structure.

20 Claims, 12 Drawing Sheets

(51) Int. Cl.
    *H04N 23/51*     (2023.01)
    *H04N 23/54*     (2023.01)
    *H04N 23/55*     (2023.01)
    *H04N 23/67*     (2023.01)

(56) References Cited

U.S. PATENT DOCUMENTS

| | | |
|---|---|---|
| 2017/0052388 A1 | 2/2017 | Kim et al. |
| 2018/0113274 A1* | 4/2018 | Jung .................. H02K 11/33 |
| 2018/0164537 A1 | 6/2018 | Lee |
| 2019/0058817 A1* | 2/2019 | Seo .................... H04N 23/51 |
| 2019/0294026 A1 | 9/2019 | Sugawara |
| 2020/0200995 A1* | 6/2020 | Lee ..................... G02B 7/08 |
| 2023/0138300 A1* | 5/2023 | Lim ..................... G02B 7/02 |
| | | 348/208.11 |

FOREIGN PATENT DOCUMENTS

| | | |
|---|---|---|
| KR | 10-1270656 B1 | 6/2013 |
| KR | 10-1538301 B1 | 7/2015 |
| KR | 10-1664886 B1 | 10/2016 |
| KR | 10-1725442 B1 | 4/2017 |
| KR | 10-2018-0065687 A | 6/2018 |
| KR | 10-2069631 B1 | 1/2020 |

\* cited by examiner

ELECTRONIC DEVICE INCLUDING CAMERA MODULE

CROSS-REFERENCE TO RELATED APPLICATION(S)

This application is a continuation application, claiming priority under § 365(c), of an International application No. PCT/KR2022/003402, filed on Mar. 11, 2022, which is based on and claims the benefit of a Korean patent application number 10-2021-0043486, filed on Apr. 2, 2021, in the Korean Intellectual Property Office, the disclosure of which is incorporated by reference herein in its entirety.

TECHNICAL FIELD

The disclosure relates to a technique for preventing shaking inside a camera module.

BACKGROUND ART

Recently, as the functions of mobile devices have been diversified, the demand for improvement of image capturing functions using mobile devices is also increasing. Accordingly, mobile devices are provided with a camera module capable of performing an auto focus (AF) function or an optical image stabilization (OIS) function when capturing an image.

The AF function is a function that automatically focuses on a subject. The AF function includes contrast AF which finds a position of a lens with the highest image sharpness and phase AF which finds a position of a lens based on an image obtained by splitting an incident light beam into two.

OIS and video digital image stabilization (VDIS) are used as technologies for compensating for shaking of an electronic device that occurs during image capturing. The OIS is a method of compensating for shaking by moving a lens included in a camera module.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

According to a camera module of the related art, there is a problem in that shaking noise is generated due to a gap inside the camera module. For example, inside the camera module, there is a gap in the optical axis direction for driving auto focus (AF) by moving a lens in the optical axis direction when capturing an image. In addition, inside the camera module, there is also a gap on a plane perpendicular to the optical axis for driving optical image stabilization (OIS) by moving the lens on the plane perpendicular to the optical axis. Therefore, when the electronic device is shaken, there is a problem in that the lens is shaken due to the gap and noise is generated.

Solution to Problem

Aspects of the disclosure are to address at least the above-mentioned problems and/or disadvantages and to provide at least the advantages described below. Accordingly, an aspect of the disclosure is to provide an electronic device and a method for a technique for preventing shaking inside a camera module.

Additional aspects will be set forth in part in the description which follows and, in part, will be apparent from the description, or may be learned by practice of the presented embodiments.

In accordance with another aspect of the disclosure, an electronic device is provided. The electronic device includes a camera module, wherein the camera module may include a lens assembly including lenses aligned along an optical axis, an actuator surrounding at least two surfaces of the lens assembly, a first magnet disposed on a first surface of the lens assembly, a first coil disposed on the actuator to correspond to the first surface of the lens assembly and configured to move the lens assembly along the optical axis, a metal shield structure disposed on an outer surface of the actuator to face the first coil, a second magnet disposed on a second surface of the lens assembly, a second coil disposed on the actuator to correspond to the second surface of the lens assembly and configured to move the lens assembly on a plane perpendicular to the optical axis, a fixing structure disposed on a third surface perpendicular to the first surface of the lens assembly, wherein at least a portion of the fixing structure has a magnetic property, at least one driving circuit electrically connected to the first coil and the second coil, and a housing in which the lens assembly and the actuator are accommodated. The fixed structure may be movable in a first direction parallel to the third surface in a plane perpendicular to the optical axis, the housing may include an opening through which one end of the fixing structure is inserted into the housing, and when one end of the fixing structure is inserted into the opening, the fixing structure may be fixed in an optical axis direction by the opening and may be fixed in the first direction by a magnetic force acting on the metal shield structure.

Advantageous Effects of Invention

According to various embodiments disclosed herein, even if a gap in the optical axis direction or a gap on a plane perpendicular to the optical axis exists inside the camera module, the shaking noise can be reduced. Even if the electronic device is shaken, the lens can maintain a fixed position within the camera module, and noise generated as the lens is shaken can be prevented or reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
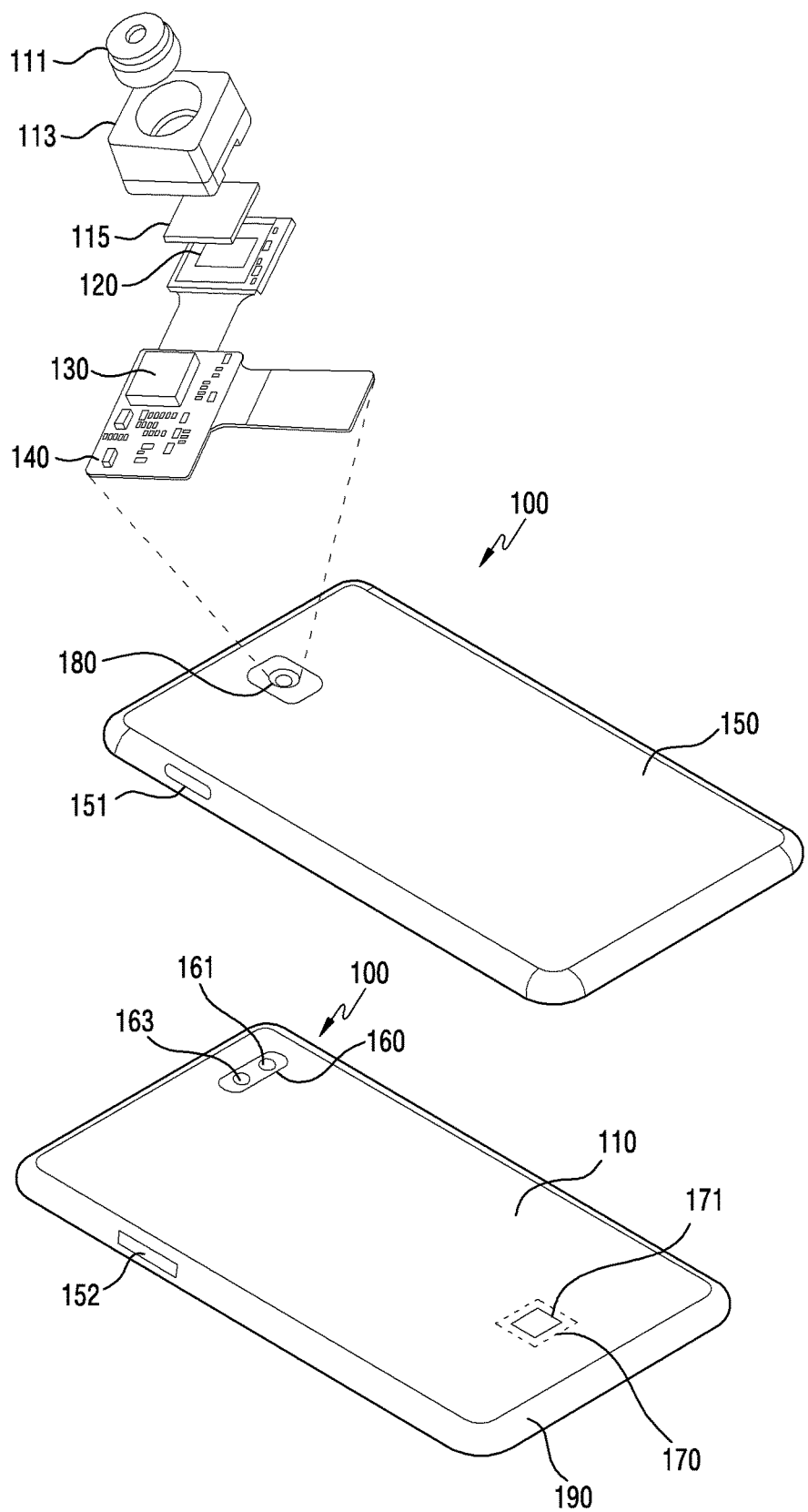
FIG. 1 illustrates a structure of an electronic device and a camera module according to an embodiment of the disclosure.

FIG. 1 illustrates a structure of an electronic device 100 and a camera module 180 according to an embodiment of the disclosure.

FIG. 1 is a view schematically illustrating an external appearance of an electronic device 100 equipped with a camera module 180 according to an embodiment and the camera module 180. Although the embodiment of FIG. 1 is illustrated and described with reference to a mobile device, for example, a smartphone, it will be clearly understood by a person ordinarily skilled in the art that the embodiment is applicable to an electronic device equipped with a camera among various electronic devices or mobile devices.

Referring to FIG. 1, a display 110 may be disposed on the front surface of the electronic device 100 according to an embodiment. In an embodiment, the display 110 may occupy most of the front surface of the electronic device 100. A display 110 and a bezel 190 area surrounding at least some edges of the display 110 may be disposed on the front surface of the electronic device 100. The display 110 may include a flat area and a curved area extending from the flat area toward the side surface of the electronic device 100. The electronic device 100 illustrated in FIG. 1 is an example, and various embodiments are possible. For example, the display 110 of the electronic device 100 may include only a flat area without a curved area, or may include a curved area only at one edge rather than opposite edges. In an embodiment, the curved area may extend toward the rear surface of the electronic device 100 so that the electronic device 100 may include an additional flat area.

In an embodiment, the electronic device 100 may additionally include a speaker, a receiver, a front camera 161, a proximity sensor, and a home key. The electronic device 100 according to an embodiment may be provided with a rear cover 150, which is integrated with the main body of the electronic device. In another embodiment, the rear cover 150 may have a form that is separable from the main body of the electronic device 100 so as to allow a battery to be replaced. The rear cover 150 may be referred to as a battery cover or a back cover.

In an embodiment, a fingerprint sensor 171 for recognizing a user's fingerprint may be included in a first area 170 of the display 110. The fingerprint sensor 171 may be disposed on a layer under the display 110 such that the fingerprint sensor 171 is not visually recognized by the user or is difficult to visually recognize. In addition, a sensor for additional user/biometric authentication in addition to the fingerprint sensor 171 may be disposed in a partial area of the display 110. In another embodiment, a sensor for user/biometric authentication may be disposed on an area of the bezel 190. For example, an IR (infrared) sensor for iris authentication may be exposed through one area of the display 110 or through one area of the bezel 190.

In an embodiment, the front camera 161 may be disposed in a second area 160 of the front surface of the electronic device 100. In the embodiment of FIG. 1, the front camera 161 is illustrated as being exposed through one area of the display 110, but in another embodiment, the front camera 161 may be exposed through the bezel 190. In another embodiment (not illustrated), the display 110 may include, on the rear surface of the second area 160, at least one of an audio module, a sensor module (e.g., the sensor 163), a camera module (e.g., the front camera 161), and a light-emitting device (not illustrated). For example, a camera module may be disposed on the front surface and/or the front surface of the electronic device 100 to face the front side and/or the lateral side of the electronic device 100. For example, the front camera 161 may not be visually exposed to the second area 160 and may include a hidden under display camera (UDC).

In an embodiment, the electronic device 100 may include one or more front cameras 161. For example, the electronic device 100 may include two front cameras such as a first front camera and a second front camera. In an embodiment, the first front camera and the second front camera may be cameras of the same type having the same specifications (e.g., pixels), but in another embodiment, the first front camera and the second front camera may be implemented as cameras having different specifications. The electronic device 100 may support a function related to a dual camera (e.g., 3D imaging or auto focusing) through the two front cameras. In an embodiment, the front camera 161 may include a plurality of camera modules and may perform multi-camera functions for general photographing, wide-angle photographing, close-up photographing, telephoto photographing, and/or ultra-wide-angle photographing. In an embodiment, the front camera 161 may include a time of flight (TOF) camera and/or a light detection and ranging (LiDAR) scanner, or may be replaced with a TOF camera and/or a LiDAR scanner. The description of the above-mentioned front camera 161 may be equally or similarly applied to a rear camera of the electronic device 100.

In an embodiment, the electronic device 100 may additionally include various kinds of hardware or sensors 163 to assist photographing, such as a flash. For example, the electronic device 100 may include a distance sensor (e.g., a TOF sensor) for detecting a distance between a subject and the electronic device 100.

In an embodiment, at least one physical key may be disposed on a side portion of the electronic device 100. For example, a first function key 151 for turning on/off the display 110 or turning on/off the power of the electronic device 100 may be disposed on the right edge with reference to the front surface of the electronic device 100. In an embodiment, a second function key 152 for controlling the volume or screen brightness of the electronic device 100 may be disposed on the left edge with reference to the front surface of the electronic device 100. Furthermore, an additional button or key may also be disposed on the front surface or the rear surface of the electronic device 100. For example, a physical button or a touch button to which a specific function is mapped may be disposed on a lower area of the front bezel 190.

The electronic device 100 illustrated in FIG. 1 corresponds to one example and does not limit the shape of the device to which the technical idea disclosed in the disclosure is applied. For example, the technical idea of the disclosure is applicable to a foldable electronic device that can be folded in a horizontal or vertical direction by adopting a flexible display and a hinge structure, a rollable electronic device that can be rolled, or a tablet or a notebook computer.

Referring to FIG. 1, the electronic device 100 according to an embodiment may include a camera module 180. The camera module 180 may include a plurality of lenses 111, a housing 113, an infrared cut filter 115, an image sensor 120, and an image signal processor (ISP) 130.

In an embodiment, the number, arrangement, or types of the plurality of lenses 111 may be different depending on whether the corresponding camera is a front camera 161 or a rear camera. The front camera 161 and the rear camera may have different characteristics (e.g., a focal length and a maximum magnification) depending on the type of a lens included in the plurality of lenses 111. The lens may move forward and rearward along the optical axis, and may operate to change a focal length so that a target object, which is a subject, can be clearly captured.

In an embodiment, the camera module 180 may include a barrel for mounting one or more lenses aligned on the optical axis and a housing 113 for mounting one or more coils and/or magnets surrounding the periphery of the barrel about the optical axis (not illustrated). In an embodiment, the camera module 180 may perform a function of stabilizing an image (e.g., optical image stabilization (OIS) acquired by an image sensor 120 using the one or more coils and/or magnets included in the housing 113. For example, the one or more coils may electromagnetically interact with each other under the control of the control circuit. For example, the camera module 180 may control an electromagnetic force by controlling the direction and/or the strength of the current passing through the one or more coils under the control of a processor, and may move (or rotate) the plurality of lenses 111 and at least a part of a lens assembly (not illustrated) including the plurality of lenses 111 in a direction substantially perpendicular to the optical axis (not illustrated) using a Lorentz force based on the electromagnetic force.

In an embodiment, the camera module 180 may use a different method for image stabilization function. For example, the camera module 180 may use video digital image stabilization (VDIS or DIS) or electrical image stabilization (EIS). In an embodiment, the camera module 180 may include a method of correcting image shaking by performing a software process on a data output value of the image sensor 120. For example, the camera module 180 may extract a motion vector based on a difference between frames of an image through VDIS (or DIS), which is a digital shake correction, and may increase sharpness through image processing. In addition, the camera module 180 may extract a motion vector based on an image through VDIS, and may recognize not only the shaking of the electronic device 100 but also the motion of a subject itself as shaking.

In an embodiment, the infrared cut filter 115 may be disposed on the top surface of the image sensor 120. An image of a subject passing through the lens may be partially filtered by the infrared cut filter 115 and may be then detected by the image sensor 120.

In an embodiment, the image sensor 120 may be disposed on the top surface of a printed circuit board 140 (e.g., a printed circuit board (PCB), a printed board assembly (PBA), a flexible PCB (FPCB), or a rigid-flex PCB (RFPCB). The image sensor 120 may be electrically connected to the image signal processor 130 connected to the printed circuit board 140 by a connector. A flexible printed circuit board (FPCB) or a cable may be used as the connector.

In an embodiment, the image sensor 120 may be a complementary metal oxide semiconductor (CMOS) sensor or a charged coupled device (CCD) sensor. A plurality of individual pixels are integrated in the image sensor 120, and each individual pixel may include a micro lens, a color filter, and a photodiode. Each individual pixel is a kind of an optical detector that is capable of converting input light into an electrical signal. In general, the optical detector is not capable of detecting the wavelength of captured light by itself and is not capable of determining color information. The optical detector may include a photodiode. For example, the image sensor 120 may amplify current generated by light received through the plurality of lenses 111 through a photoelectric effect of a light receiving element. For example, each individual pixel may include a photoelectric transformation element (or a position-sensitive detector (PSD)) and a plurality of transistors (e.g., a reset transistor, a transfer transistor, a select transistor, and a driver transistor).

In an embodiment, the light information of a subject that is incident through the plurality of lenses 111 may be converted into an electrical signal by the image sensor 120 and may be input to the image signal processor 130.

In an embodiment, when the image signal processor 130 and the image sensor 120 are physically separated, a sensor interface conforming to an appropriate standard electrically connects the image sensor 120 and the image signal processor 130 to each other.

In an embodiment, the image signal processor 130 may perform image processing on electrically converted image data. A process in the image signal processor 130 may be divided into a pre-ISP (hereinafter, pre-processing) and an ISP chain (hereinafter, post-processing). Image processing before a demosaicing process may mean pre-processing, and image processing after a demosaicing process may mean post-processing. The pre-processing may include 3A processing, lens shading correction, edge enhancement, dead pixel correction, and knee correction. The 3A may include at least one of auto white balance (AWB), auto exposure (AE), and auto focusing (AF). The post-processing process may include at least one of a sensor index value change, a tuning parameter change, and an aspect ratio adjustment. The post-processing process may include a process of processing image data output from the image sensor 120 or image data output from a scaler. The image signal processor 130 may adjust at least one of contrast, sharpness, saturation, or dithering of an image through the post-processing process. Here, contrast, sharpness, and saturation adjustment procedures may be performed in a YUV color space, and a dithering procedure may be performed in an RGB (Red Green Blue) color space. A part of the pre-processing process may be performed in the post-processing process, or a part of the post-processing process may be performed in the pre-processing process. In addition, a part of the pre-processing process may overlap a part of the post-processing process.

In an embodiment, the camera module 180 may be disposed on the front surface as well as the rear surface of the electronic device 100. In addition, the electronic device 100 may include a plurality of camera modules 180 as well as one camera module 180 in order to improve camera performance. For example, the electronic device 100 may further include a front camera 161 for video call or self-camera photographing. The front camera 161 may support a relatively low number of pixels compared to the rear camera module. The front camera 161 may be relatively smaller than the camera module 180 of the rear camera.

Figure 2A:
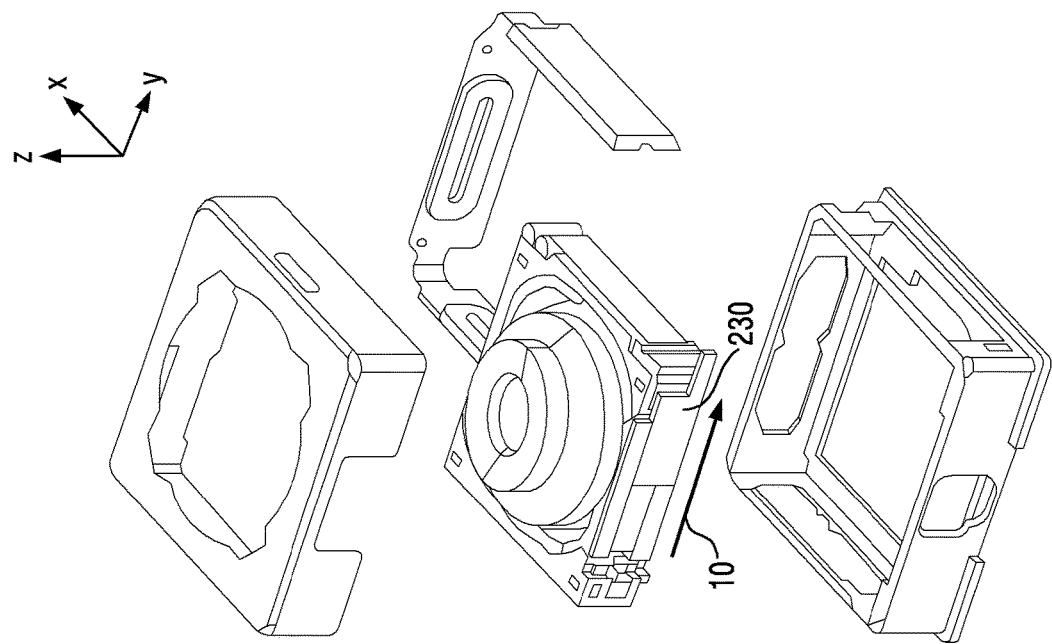
FIG. 2A is an exploded perspective view of a camera module according to an embodiment of the disclosure.
Figure 2A:
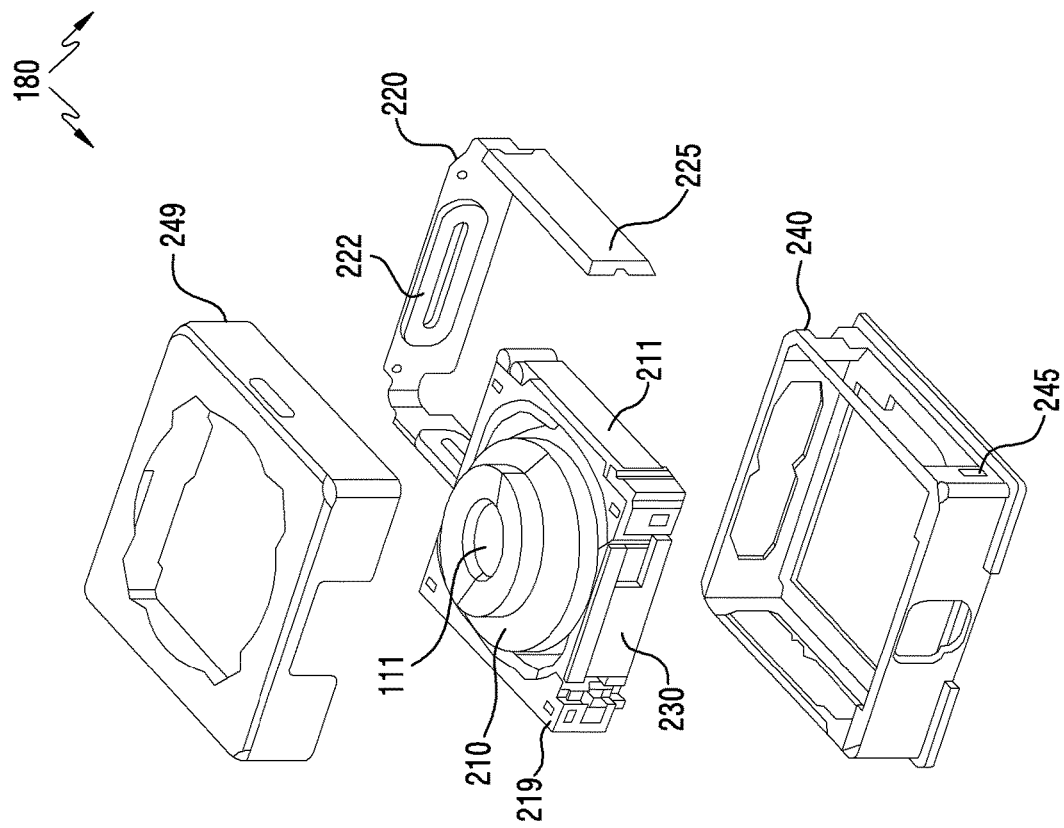

FIG. 2A is an exploded perspective view of a camera module 180 according to an embodiment of the disclosure.

Figure 2B:
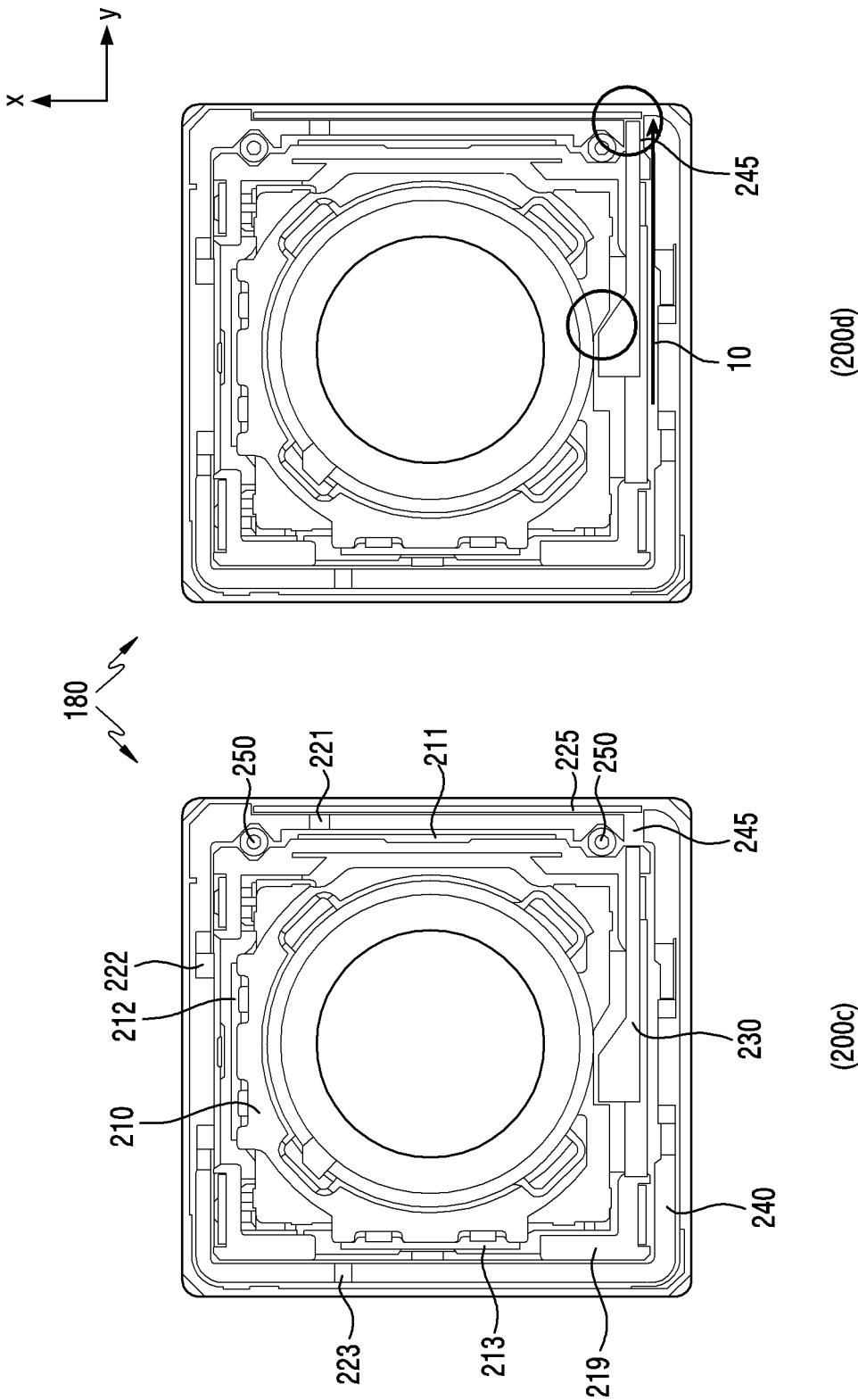
FIG. 2B is a plan view of the camera module according to an embodiment of the disclosure.

FIG. 2B is a plan view of the camera module 180 according to an embodiment of the disclosure. Among the components illustrated in FIGS. 2A and 2B, the components described in FIG. 1 may be briefly described or a description thereof may be omitted.

Referring to FIGS. 2A and 2B, the camera module 180 may include a lens assembly 210, an actuator 220, and a housing 240.

According to an embodiment, the camera module 180 may include a lens assembly 210. The lens assembly 210 may include a plurality of lenses 111 aligned along an optical axis. For example, the optical axis may be understood as a z axis. Light may travel from the front (e.g., +z direction) to the rear (e.g., −z direction) of the lens assembly 210. The light incident from the front side of the lens assembly 210 to the frontmost lens among the plurality of lenses 111 may travel to the rear side of the lens assembly 210 through the plurality of lenses 111.

According to an embodiment, the lens assembly 210 may include a plurality of lenses 111, a lens barrel accommodating the plurality of lenses 111, and an OIS carrier accommodating the lens barrel. For example, the lens barrel may accommodate the plurality of lenses 111 aligned along an optical axis direction (e.g., a z-axis direction). The lens barrel may be accommodated in the OIS carrier. The lens barrel may be coupled to at least a portion of the inner surface of the OIS carrier. In an embodiment, the plurality of lenses 111 and the lens barrel may be coupled to the OIS carrier to move integrally with the OIS carrier. In an embodiment, the plurality of lenses 111, the lens barrel, and the OIS carrier may be integrally formed. In various embodiments of the disclosure, it may be understood that the lens assembly 210 includes a plurality of lenses 111, a lens barrel, and an OIS carrier.

According to an embodiment, the lens assembly 210 may be disposed to be movable within the housing 240. For example, the lens assembly 210 may be moved on a two-dimensional plane perpendicular to an optical axis (e.g., the z axis). According to an embodiment, the electronic device 100 may move the lens assembly 210 in order to perform an OIS function. For example, the electronic device 100 may correct the shaking of the electronic device 100 by moving the lens assembly 210 in a direction perpendicular to the optical axis (e.g., the +x/−x direction or the +y/−y direction).

According to an embodiment, the camera module 180 may include an auto focus (AF) carrier 219 that accommodates the lens assembly 210 and is accommodated in the housing 240. According to an embodiment, the AF carrier 219 may be disposed to be movable within the housing 240. For example, the AF carrier 219 may be moved on a 1-dimension line parallel to the optical axis (e.g., the z-axis). According to an embodiment, the electronic device 100 may move the AF carrier 219 in order to perform the AF function. For example, the electronic device 100 may adjust the focal length of the camera by moving the AF carrier 219 in a direction parallel to the optical axis (e.g., +z/−z direction). According to an embodiment, when the electronic device 100 moves the AF carrier 219 along the optical axis, the lens assembly 210 accommodated in the AF carrier 219 may also move along the optical axis. In various embodiments of the disclosure, the case in which the lens assembly 210 is moved in the optical axis direction may be understood to include a case in which the lens assembly 210 is moved together as the AF carrier 219 is moved in the optical axis direction.

According to an embodiment, the camera module 180 may include an actuator 220 surrounding at least two surfaces of the lens assembly 210. For example, the actuator 220 may surround the first surface (e.g., the +y direction) and the second surface (e.g., the +x direction) of the lens assembly 210. According to an embodiment, the actuator 220 may be disposed to surround three surfaces of the lens assembly 210. For example, the actuator 220 may be disposed to surround the first surface (e.g., the +y direction), the second surface (e.g., the +x direction), and the fourth surface (e.g., the −y direction) of the lens assembly 210.

According to an embodiment, the camera module 180 may include a first magnet 211 disposed on the first surface (e.g., the +y direction) of the lens assembly 210. The camera module 180 may include a first coil 221 disposed on the actuator 220 to correspond to the first surface (e.g., +y direction) of the lens assembly 210. For example, the first magnet 211 may be coupled to the AF carrier 219 and move together with the AF carrier 219. According to an embodiment, the first magnet 211 and the first coil 221 may be disposed to face each other.

According to an embodiment, the camera module 180 may include a second magnet 212 disposed on the second surface (e.g., the x direction) of the lens assembly 210. The camera module 180 may include a second coil 222 disposed on the actuator 220 to correspond to the second surface (e.g., the +x direction) of the lens assembly 210. For example, the second magnet 212 may be coupled to the lens assembly 210 (or the AF carrier) and move together with the lens assembly 210. According to an embodiment, the second magnet 212 and the second coil 222 may be disposed to face each other.

According to an embodiment, the camera module 180 may further include a third magnet 213 disposed on a fourth surface (e.g., the −y direction) of the lens assembly 210. The camera module 180 may further include a third coil 223 disposed on the actuator 220 to correspond to the fourth surface (e.g., −y direction) of the lens assembly 210. For example, the third magnet 213 may be coupled to the lens assembly 210 (or the AF carrier) and move together with the lens assembly 210. According to an embodiment, the third magnet 213 and the third coil 223 may be disposed to face each other.

According to an embodiment, the camera module 180 may include at least one driving circuit electrically connected to the first coil 221 and the second coil 222. According to an embodiment, the driving circuit may be electrically connected to the third coil 223 together with the first coil 221 and the second coil 222. According to an embodiment, the driving circuit may control the first coil 221, the second coil 222, and/or the third coil 223 to move the lens assembly 210 in the optical axis direction (e.g., +z/−z direction) or in a direction perpendicular to the optical axis (e.g., the +x/−x direction, or the +y/−y direction). According to an embodiment, the driving circuit may be disposed on the actuator 220. For example, the actuator 220 may include a flexible printed circuit board (FPCB) on which the first coil 221, the second coil 222, and/or the third coil 223 are disposed, and the driving circuit may be disposed on the FPCB.

According to an embodiment, the electronic device 100 may control the first coil 221 to perform the AF function. In addition, the electronic device 100 may control the second coil 222 and/or the third coil 223 to perform the OIS function. For example, the driving circuit may control the first coil 221 to move the lens assembly 210 (or the AF carrier 219) in the optical axis (e.g., z-axis) direction. As another example, the driving circuit may control the second coil 222 to move the lens assembly 210 (or the OIS carrier) in a direction perpendicular to the optical axis (e.g., +x/−x direction). The driving circuit may control the third coil 223 to move the lens assembly 210 (or the OIS carrier) in a direction perpendicular to the optical axis (e.g., +y/−y direction). According to an embodiment, the first magnet 211, the second magnet 212, and the third magnet 213 may be moved in the optical axis direction or a direction perpendicular to the optical axis by magnetic forces generated according to interaction with the first coil 221, the second coil 222, and a third coil 223, respectively.

According to an embodiment, the camera module 180 may include a housing 240 in which the lens assembly 210 and the actuator 220 are accommodated. The camera module 180 may further include a shield can 249 formed to surround the outside of the housing 240. In an embodiment, the shield can 249 may include an opening formed in the upper central portion of the shield can 249 such that some of the plurality of lenses 111 can be exposed.

According to an embodiment, the camera module 180 may use a ball bearing method to move the lens assembly 210 along the optical axis or on a plane perpendicular to the optical axis. The camera module 180 may include at least one ball for a ball bearing. For example, the camera module 180 may include at least two balls 250 disposed between the actuator 220 and the lens assembly 210 (or the AF carrier 219) to move the lens assembly 210 along the optical axis. As another example, the camera module 180 may include at least four balls (not illustrated) disposed between the housing 240 and the lens assembly 210 (or the OIS carrier) to move the lens assembly 210 on a plane perpendicular to the optical axis.

According to an embodiment, the camera module 180 may include a fixing structure 230 disposed on the third surface (e.g., the −x direction) perpendicular to the first surface (e.g., the +y direction) of the lens assembly 210. According to an embodiment, at least a portion of the fixing structure 230 may have a magnetic property.

According to an embodiment, the fixing structure 230 may be coupled to the AF carrier 219 to correspond to the third surface (e.g., the −x direction) of the lens assembly 210.

In an embodiment, comparing the views of reference numeral 200a and reference numeral 200b of FIG. 2A, the fixing structure 230 may be moved from a plane perpendicular to the optical axis in a first direction 10 (e.g., the +y direction) parallel to the third surface. For example, the fixing structure 230 may be coupled to the AF carrier 219 to move in the first direction 10 relative to the lens assembly 210. As another example, the fixing structure 230 may be coupled to the AF carrier 219 and may be moved in a direction opposite to the first direction 10 relative to the lens assembly 210. As another example, the fixing structure 230 may be moved along an axis (e.g., the y-axis) parallel to the third surface in a plane perpendicular to the optical axis.

According to an embodiment, the camera module 180 may include a metal shield structure 225 disposed on an outer surface of the actuator 220 to face the first coil 221. For example, the metal shield structure 225 may be disposed in the +y direction relative to the first coil 221. In an embodiment, the metal shield structure 225 may be understood to mean a yoke disposed to induce an electric field of the first coil 221 toward the first magnet 211. In an embodiment, the metal shield structure 225 may mean a structure for blocking at least one of an electric force by the first coil 221 or a magnetic force by the first magnet 211. Although being referred to as the metal shield structure 225 in this document, the metal shield structure 225 may be made of various materials capable of inducing an attractive force with the fixed structure 230 having a magnetic property. For example, the metal shield structure 225 may be made of a polymer material capable of inducing an attractive force with the fixed structure 230, or may be made of a composite material including at least a layer having a shielding function. In addition to this, various embodiments that can be implemented by those skilled in the art are possible.

According to an embodiment, the fixing structure 230 may include a magnetic material disposed in an area adjacent to the metal shield structure 225. According to an embodiment, the fixing structure 230 may include a magnetic shield member disposed on a remaining surface except for the surface facing the metal shield structure 225 among the outer surfaces of the magnetic material. The magnetic shield member may surround at least a portion of the magnetic material, and may shield the remaining surface except for the surface facing the metal shield structure 225 from a magnetic property. For example, the magnetic shield member may include a ferromagnetic material (e.g., steel plate cold commercial (SPCC)) or a metallic material (e.g., steel).

According to an embodiment, since at least a portion of the fixing structure 230 has a magnetic property, an attractive force may be generated through interaction with the metal shield structure 225. For example, when at least a portion of the fixed structure 230 that has a magnetic property approaches the metal shield structure 225 by a predetermined distance or less, the fixed structure 230 and the metal shield structure 225 may be attracted to each other. As another example, when the fixing structure 230 and the metal shield structure 225 come into contact with each other, the fixing structure 230 may be fixed in the first direction 10 by the magnetic force.

According to an embodiment, the housing 240 may include an opening 245 through which one end of the fixing structure 230 may be inserted into the housing 240.

In an embodiment, comparing the views of reference numeral 200c and reference numeral 200d of FIG. 2B, one end of the fixing structure 230 may be inserted into the opening 245 of the housing 240. For example, when the fixing structure 230, which is not inserted into the opening 245, is moved in the first direction 10 as in the view of reference numeral 200c, one end of the fixing structure 230 may be inserted into the opening 245 as in the view of reference numeral 200d.

According to an embodiment, when the one end of the fixing structure 230 is inserted into the opening 245, the fixing structure 230 may be fixed in the optical axis direction (e.g., the z-axis direction) by the opening 245, and may be fixed in the first direction 10 by a magnetic force acting on the metal shield structure 225. The fixing structure 230, the opening 245, and the metal shield structure 225 will be described later with reference to FIGS. 3 to 9.

It has been described that the first surface of the lens assembly 210 is in the +y-axis direction, the second surface is in the +x-axis direction, the third surface is in the -x-axis direction, and the fourth surface is in the -y-axis direction with reference to FIGS. 2A and 2B, but this is an example, and various arrangements to which embodiments of the disclosure are applicable are possible. For example, the first surface of the lens assembly 210 may be in the +y direction, the second surface may be in the -y direction, the third surface may be in the -x direction, and the fourth surface may be in the +x-axis direction.

Figure 3:
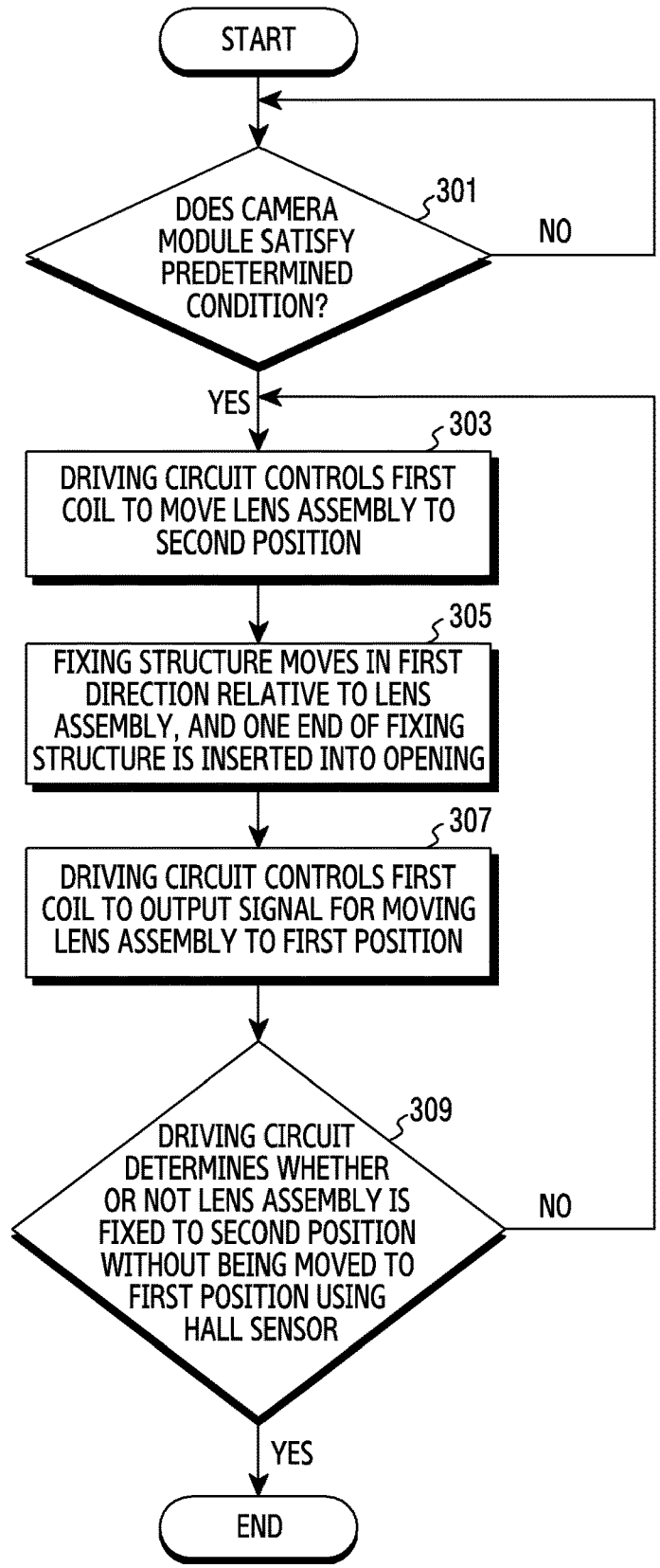
FIG. 3 is a flowchart of operations of locking a lens assembly according to an embodiment of the disclosure.

FIG. 3 is a flowchart of operations of locking the lens assembly 210 according to an embodiment of the disclosure. The operations illustrated in FIG. 3 may be performed by the camera module 180 and the driving circuit included in the camera module 180.

Referring to FIG. 3, in operation 301, the driving circuit may determine whether or not the camera module 180 satisfies a predetermined condition. According to an embodiment, the predetermined condition may include a case in which it is necessary to fix the lens assembly 210 in the camera module 180. For example, when receiving a signal to deactivate the camera module 180 from an application processor (AP) electrically connected to the camera module 180, the driving circuit may determine that the predetermined condition is satisfied.

According to an embodiment, the electronic device 100 may perform the operations illustrated in FIG. 3 to reduce noise generated when the lens assembly 210 is shaken due to a gap inside the camera module 180. For example, according to the prior art, when the electronic device is shaken in the state in which the electronic device does not apply power to the camera module (e.g., the state in which the camera module is inactive), the lens assembly may be shaken together inside the camera module and noise may be generated. According to an embodiment of the disclosure, since the lens assembly 210 is fixed at a predetermined position by the operations illustrated in FIG. 3 in a state in which the electronic device 100 does not apply power to the camera module 180, the noise can be reduced or prevented.

Figure 4:
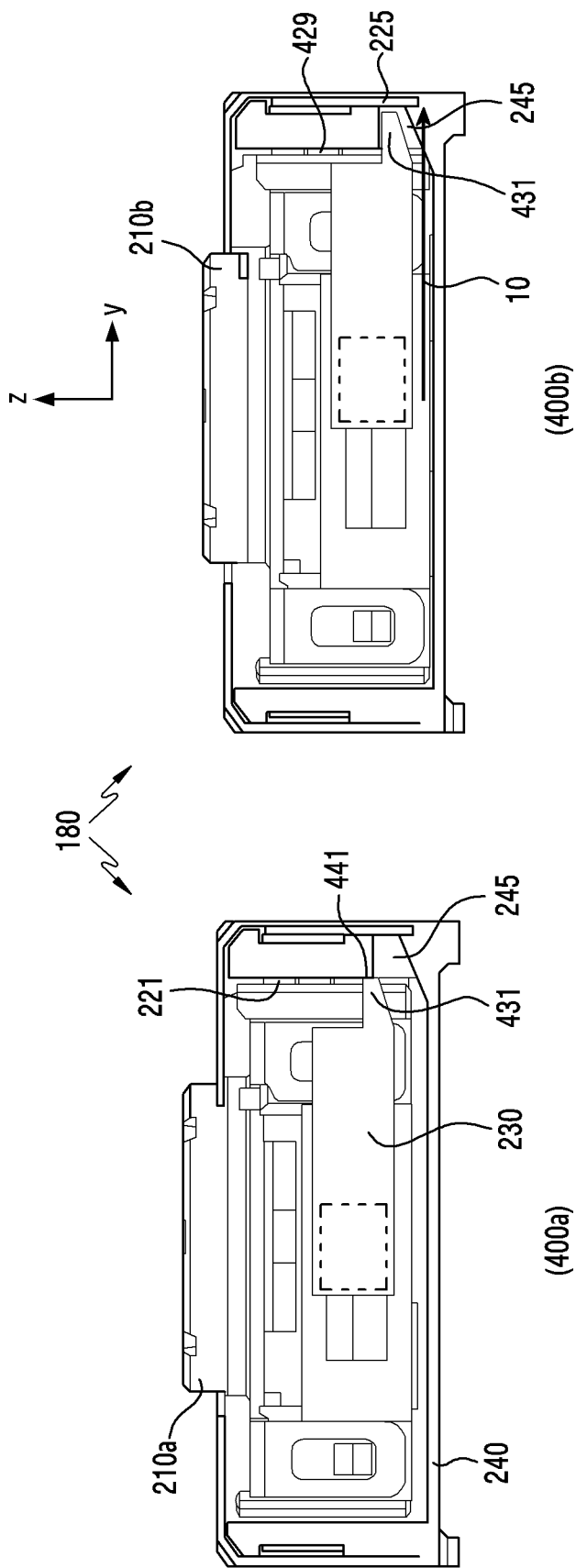
FIG. 4 illustrates a fixing structure inserted into an opening according to an embodiment of the disclosure.

According to an embodiment, in operation 303, the driving circuit may control the first coil 221 to move the lens assembly 210 to a second position (e.g., 210b in FIG. 4).

According to an embodiment, in operation 305, the fixing structure 230 may move in the first direction 10 relative to the lens assembly 210, and one end of the fixing structure 230 may be inserted into the opening 245.

According to an embodiment, in operation 307, the driving circuit may output a signal for controlling the first coil 221 to move the lens assembly 210 to a first position (e.g., the first position 210a in FIG. 4) in order to determine whether or not the lens assembly 210 is fixed in the optical axis direction (e.g., the z-axis direction).

According to an embodiment, in operation 309, the driving circuit may determine whether or not the lens assembly 210 is fixed to the second position without being moved to the first position through a Hall sensor. In an embodiment, when the lens assembly 210 is fixed to the second position, the driving circuit may determine that the lens assembly 210 is fixed relative to the housing 240. In another embodiment, when the lens assembly 210 is not fixed to the second position, the driving circuit may perform operation 303 again to fix the lens assembly 210.

According to an embodiment, operations 303 to 309 will be described later with reference to FIGS. 4 to 6.

FIG. 4 illustrates a fixing structure 230 inserted into the opening 245 according to an embodiment of the disclosure.

Referring to FIG. 4, the view of reference numeral 400a illustrates the camera module 180 to which the lens assembly 210 is not fixed, and the view of reference numeral 400b illustrates the camera module 180 to which the lens assembly 210 is fixed. Among the components illustrated in FIG. 4, the components illustrated in FIGS. 2A to 2B may be briefly described or a description thereof may be omitted.

According to an embodiment, a surface corresponding to the first surface (e.g., the +y direction) of the lens assembly 210 among the inner surfaces of the housing 240 may be referred to as a first side surface 441. According to an embodiment, the opening 245 described with reference to FIGS. 2A to 2B may be included in the first side surface 441.

According to an embodiment, in the view of reference numeral 400a, when the lens assembly 210 is located at a first position 210a relative to the housing 240, one end 431 of the fixing structure 230 may be in contact with the first side surface 441.

According to an embodiment, the driving circuit may control the first coil 221 to move the lens assembly 210 (or the AF carrier 219) along the optical axis (e.g., the z axis). For example, the driving circuit may move the lens assembly 210 to the second position 210b shifted in the optical axis direction (e.g., the -z direction) more than the first position 210a.

According to an embodiment, when the lens assembly 210 moves from the first position 210a to the second position 210b relative to the housing 240, the fixing structure 230 may move in the first direction 10 relative to the lens assembly 210. For example, the fixing structure 230 may be moved in the first direction 10 by a magnetic force acting on the metal shield structure 225.

According to an embodiment, in the view of reference numeral 400b, when the lens assembly 210 is located at a second position 210b relative to the housing 240, the one end 431 of the fixing structure 230 may be inserted into the opening 245.

According to an embodiment, when the one end 431 of the fixing structure 230 is inserted into the opening 245, the lens assembly 210 may be fixed in the optical axis direction (e.g., the z-axis direction) by the opening 245. For example, in the state in which the one end 431 of the fixing structure 230 is inserted into the opening 245, it may be difficult for the fixing structure 230 to move in the +z direction or the -z direction. Accordingly, the fixing structure 230 and the lens assembly 210 may be fixed in the z-axis direction.

According to an embodiment, the camera module 180 may further include a Hall sensor 429 facing the first magnet 211. The Hall sensor 429 may be disposed on the actuator 220 to correspond to the first surface (e.g., the +y direction) of the lens assembly 210. For example, the Hall sensor 429 may be disposed adjacent to the first coil 221. According to an embodiment, the driving circuit may detect the position of the lens assembly 210 (e.g., the first position 210a and the second position 210b) using the Hall sensor 429.

According to an embodiment, the one end 431 of the fixing structure 230 may be in contact the first side surface 441 while the camera module 180 drives AF. The camera module 180 may move the lens assembly 210 within a first range for AF driving. For example, the first range may be the maximum distance that the lens assembly 210 can move in the optical axis direction (e.g., the z-axis or −z-axis direction) during the AF driving operation. The one end 431 of the fixing structure 230 may not be inserted into the opening 245 while the lens assembly 210 is moved within the first range. According to an embodiment, the electronic device 100 may move the lens assembly 210 to the second position 210b in order to insert the one end 431 of the fixing structure 230 into the opening 245. The second position 210b of the lens assembly 210 may be a position that is not included in the first range.

Referring to FIGS. 3 to 4, in operation 303, the driving circuit may control the first coil 221 to move the lens assembly 210 to the second position 210b. When the lens assembly 210 is moved to the second position 210b, the one end 431 of the fixing structure 230 may be inserted into the opening 245 in operation 305 and in the view of reference numeral 400b.

According to an embodiment, regarding operation 307, the driving circuit may control the first coil 221 to determine whether or not the lens assembly 210 is fixed in the optical axis direction (e.g., the z-axis direction). For example, the driving circuit may control the first coil 221 to output a signal for moving the lens assembly 210 to the first position 210a. According to an embodiment, when the one end 431 of the fixing structure 230 is inserted into the opening 245, it may be difficult for the lens assembly 210 to move in the optical axis direction due to the opening 245. Accordingly, even when the driving circuit controls the first coil 221, the lens assembly 210 may remain fixed at the second position 210b.

According to an embodiment, in operation 309, the driving circuit may determine whether or not the lens assembly 210 is fixed at the second position 210b using the Hall sensor 429. For example, when the one end 431 of the fixing structure 230 is inserted into the opening 245, the lens assembly 210 may be fixed at the second position 210b. For another example, when the one end 431 of the fixing structure 230 is not inserted into the opening 245, the position of the lens assembly 210 may be changed to the first position 210a. According to an embodiment, the driving circuit may detect the position of the lens assembly 210 using the Hall sensor 429.

Figure 5:
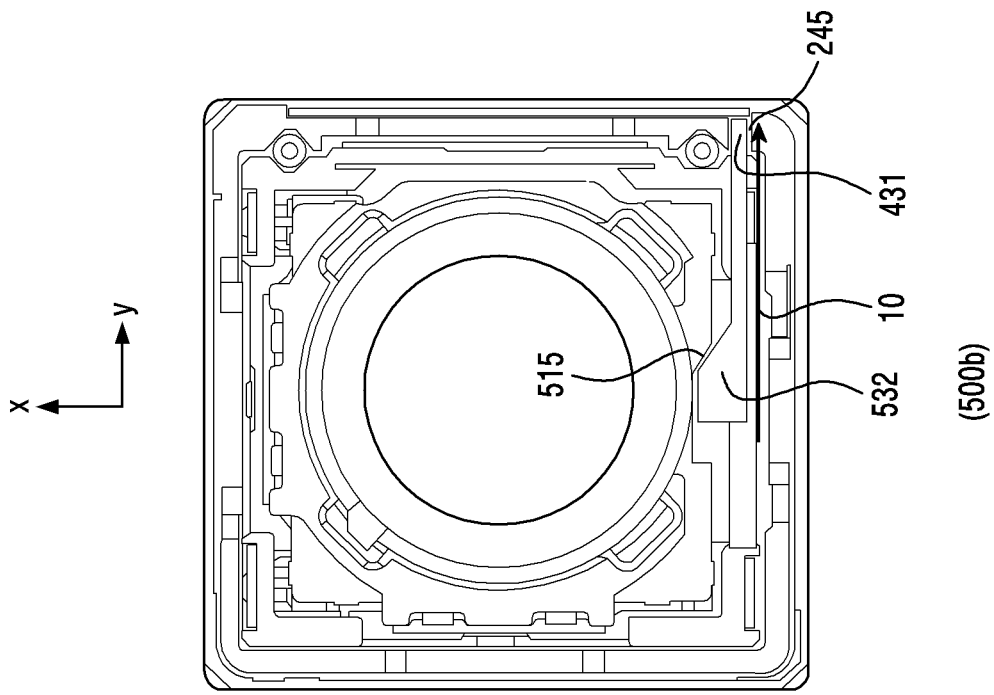
FIG. 5 illustrates a recess and a protrusion according to an embodiment of the disclosure.
Figure 5:
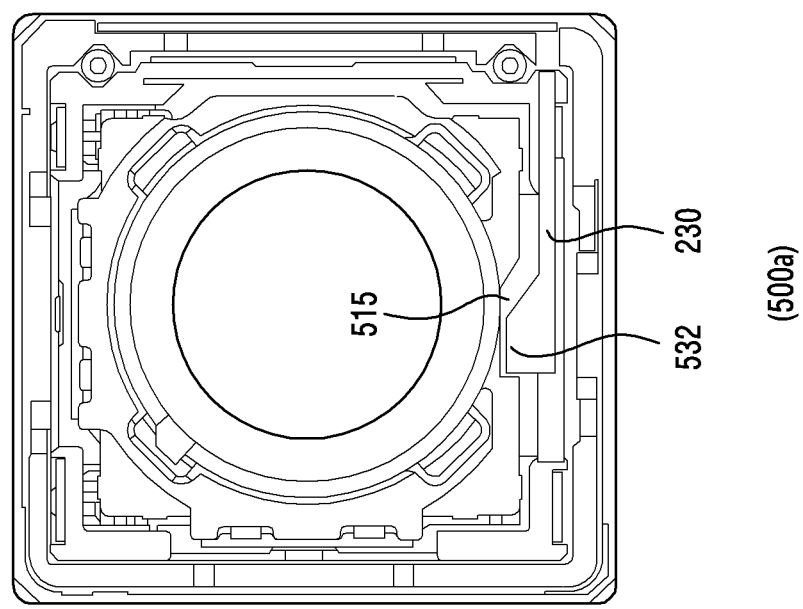

FIG. 5 illustrates a recess 515 and a protrusion 532 according to an embodiment of the disclosure.

According to an embodiment, in the view of reference numeral 500a, the third surface (e.g., the −x direction) of the lens assembly 210 may include an inwardly concave recess 515. For example, the OIS carrier may include a recess 515 corresponding to the third surface of the lens assembly 210. According to an embodiment, the other end of the fixing structure 230 may include a protrusion 532 corresponding to the recess 515.

According to an embodiment, in the view of reference numeral 500b, when the one end 431 of the fixing structure 230 is inserted into the opening 245 as the fixing structure 230 moves in the first direction 10, the protrusion 532 may come into contact with one end of the recess 515.

According to an embodiment, when the one end 431 of the fixing structure 230 is inserted into the opening 245, the lens assembly 210 may be fixed on a plane perpendicular to the optical axis (e.g., the z axis) by the contact between the one end of the recess 515 and the protrusion 532. A surface in which the one end of the recess 515 and the protrusion 532 are contact with each other will be described later with reference to FIG. 6.

According to an embodiment, the shape of the camera module 180 illustrated in FIG. 5 is an example, and various embodiments that can be implemented by a person ordinarily skilled in the art are possible. For example, the fixing structure 230 may not include the protrusion 532 described with reference to FIG. 5.

Figure 6:
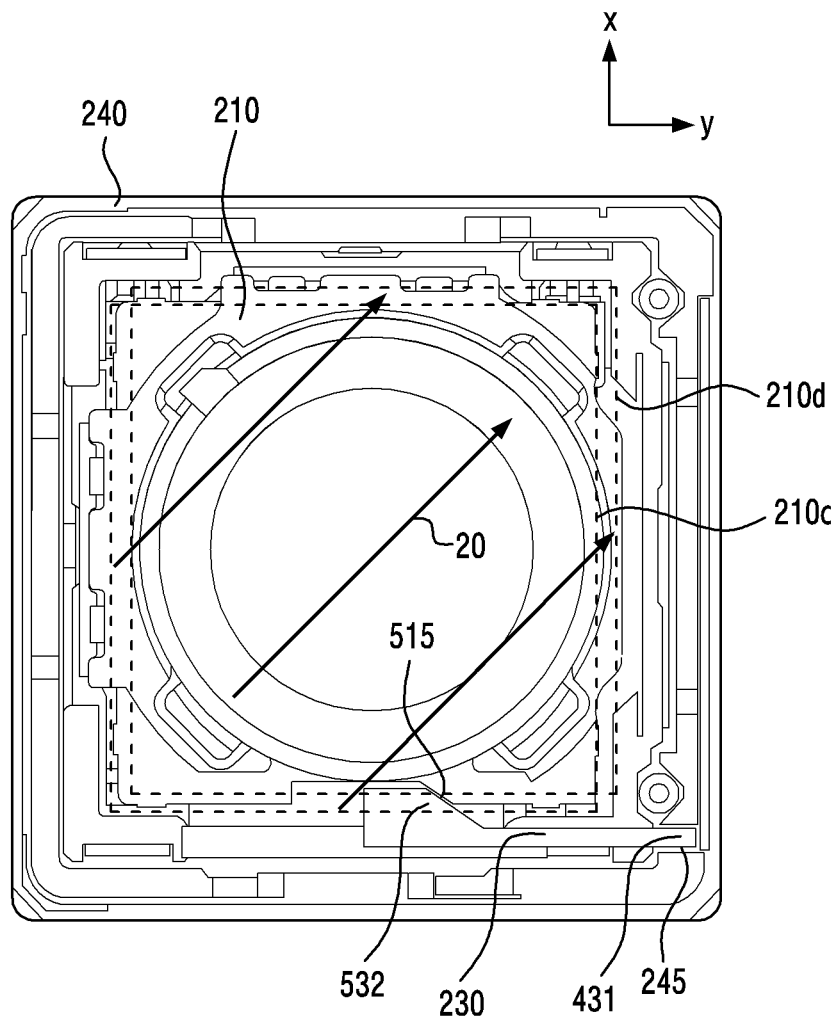
FIG. 6 illustrates a lens assembly fixed relative to a second direction according to an embodiment of the disclosure.

FIG. 6 illustrates the lens assembly 210 fixed in a second direction 20 according to an embodiment of the disclosure.

Referring to FIG. 6, an angle between the third surface and the surface in which the one end of the recess 515 and the protrusion 532 are contact with each other may be an angle of 45 degrees. According to an embodiment, when the one end 431 of the fixing structure 230 is inserted into the opening 245, the lens assembly 210 may be fixed in the second direction 20. For example, the second direction 20 may be understood to mean a direction perpendicular to the contact surface on the plane perpendicular to the optical axis (e.g., the z axis).

According to an embodiment, when the protrusion 532 located at the other end of the fixing structure 230 comes into contact with the one end of the recess 515 included in the lens assembly 210, the lens assembly 210 may be moved from the position indicated by reference number 210c to the position indicated by reference number 210d. For example, when the fixing structure 230 is moved in the first direction 10 by a magnetic force acting on the metal shield structure 225, the protrusion 532 located at the other end of the fixing structure 230 may come into contact with the one end of the recess 515 included in the lens assembly 210. When the protrusion 532 of the fixing structure 230 pushes the one end of the recess 515 included in the lens assembly 210 in a direction perpendicular to the inclined surface of the recess 515, the lens assembly 210 may be moved in the second direction 20 perpendicular to the inclined surface. When the fixing structure 230 is moved in the first direction 10, the lens assembly 210 may be moved by a predetermined distance in the second direction 20. When the lens assembly 210 is moved to the position indicated by reference number 210d, the gap between the first surface (e.g., the +y direction) and the second surface (e.g., the +x direction) of the lens assembly 210 and the housing 240 may be reduced or the first and second surfaces of the lens assembly 210 and the housing 240 may come into contact with each other.

According to an embodiment, it has been described that the angle between the third surface and the surface in which the one end of the recess 515 and the protrusion 532 are in contact with each other is an angle of 45 degrees, but the description of the contact surface is an example and various shapes that can fix the lens assembly 210 in the second direction 20 are possible. For example, the surface in which the one end of the recess 515 and the protrusion 532 are in contact with each other may have an angle of 30 degrees to 60 degrees, and the one end of the recess 515 and/or the protrusion 532 may have a curved shape.

Referring to FIGS. 4 to 6, when the fixing structure 230 is moved in the first direction 10 relative to the lens assembly 210, the one end 431 of the fixing structure 230 may be inserted into the opening 245 in the housing 240, and the protrusion 532 located at the other end of the fixing structure 230 may come into contact with the recess 515 of the lens assembly 210. Accordingly, the lens assembly 210 may be fixed in the −z direction, the +y direction, and the +x direction relative to the center of the housing 240. For example, in at least one of the −z direction, the +y direction, or the +x direction of the lens assembly 210, the gap may be reduced or substantially no gap may exist between the lens assembly 210 (or the OIS carrier or the AF carrier 219) and the housing 240.

According to an embodiment, when the lens assembly 210 is fixed in the directions of all three (e.g., the x axis, the y axis, and the z axis) by the fixing structure 230, noise that may be generated while the lens assembly 210 is shaken within the camera module 180 can be reduced. For example, when the electronic device 100 is shaken in the state in which the electronic device 100 does not apply power to the camera module 180, noise generated while the lens assembly 210 is shaken within the camera module 180 can be reduced or prevented.

According to an embodiment, when the lens assembly 210 is fixed in both of the x-axis and the y-axis direction on the plane perpendicular to the optical axis, compared to the case where the lens assembly 210 is fixed relative to either the x-axis or the y-axis, the lens assembly 210 can be more strongly fixed to the housing 240. For example, when the lens assembly 210 is fixed in the second direction 20, both of the attractive force between the first magnet 211 and the first coil 221 and the attractive force between the second magnet 212 and the second coil 222 can fix the lens assembly 210. When the lens assembly 210 is not fixed in the x-axis direction but is fixed in the y-axis direction, the attractive force between the second magnet 212 and the second coil 222 is reduced. Thus, the lens assembly 210 can be weakly fixed. Accordingly, the fixing structure 230 may move the lens assembly 210 in the second direction 20 through the contact between the recess 515 and the protrusion 532.

Figure 7:
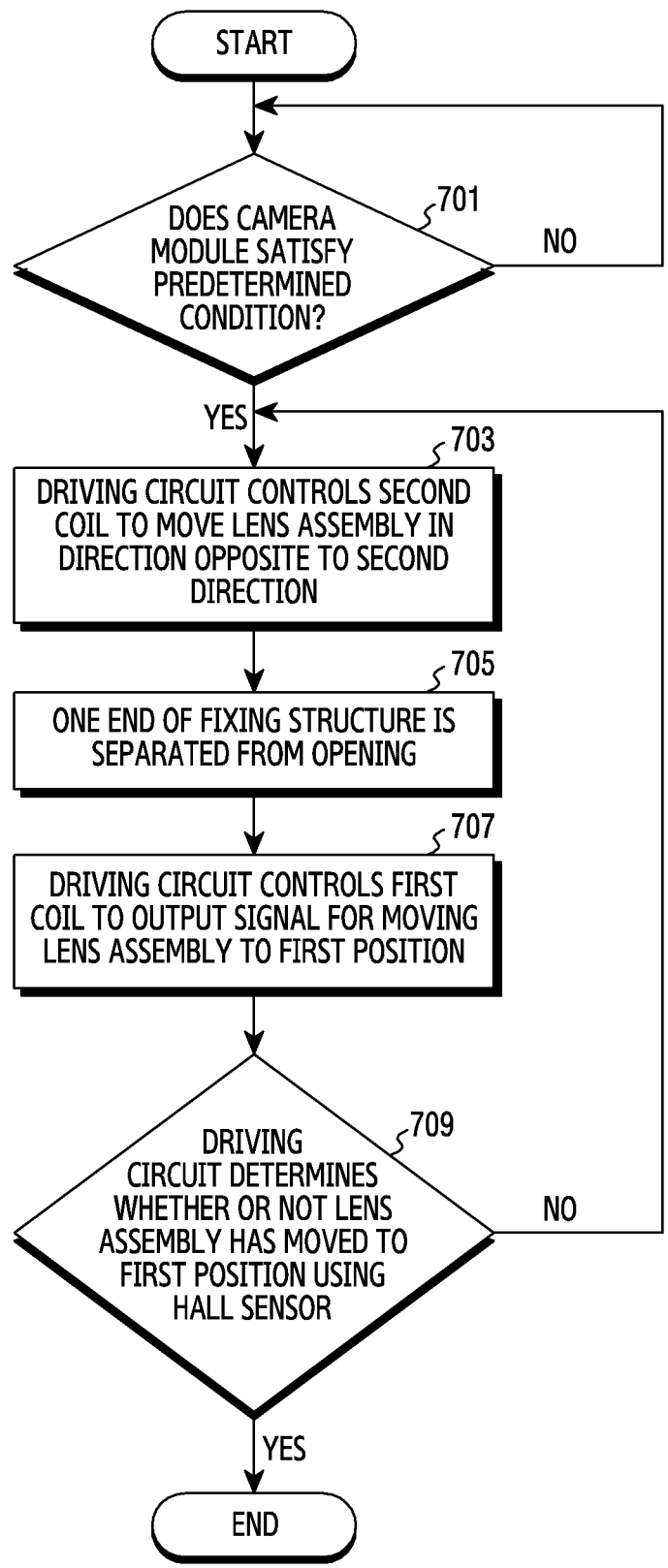
FIG. 7 is a flowchart of operations of unlocking a lens assembly according to an embodiment of the disclosure.

FIG. 7 is a flowchart of operations of unlocking the lens assembly 210 according to an embodiment of the disclosure. The operations illustrated in FIG. 7 may be performed by the camera module 180 and a driving circuit included in the camera module 180.

According to an embodiment, in operation 701, the driving circuit may determine whether or not the camera module 180 satisfies a predetermined condition. In an embodiment, the predetermined condition in operation 701 may be understood to be different from the predetermined condition described in operation 301 of FIG. 3. For example, the predetermined condition in operation 701 may include a case in which it is not necessary to fix the lens assembly 210 in the camera module 180. For example, when the driving circuit receives a signal to activate the camera module 180 from the AP connected to the camera module 180, the driving circuit may determine that the predetermined condition is satisfied. When the electronic device 100 activates the camera module 180, AF and/or OIS can be driven. Thus, it may be necessary to move the lens assembly 210 to unlock the fixing of the lens assembly 210.

According to an embodiment, in operation 703, the driving circuit may control the second coil 222 to move the lens assembly 210 in a direction opposite to the second direction 20. For example, when the driving circuit controls the second coil 222 to move the lens assembly 210 in the −x-axis direction, the one end of the recess 515 included in the lens assembly 210 may push the protrusion 532 of the fixing structure 230 in a direction perpendicular to the inclined surface of the recess 515. When the fixing structure 230 is moved in a direction 15 opposite to the first direction 10 according to contact with the one end of the recess 515, the lens assembly 210 may be moved in a direction opposite to the second direction 20. According to an embodiment, the force by which the second coil 222 pushes the fixed structure 230 by the driving circuit may be greater than the attractive force between the fixed structure 230 and the metal shield structure 225.

In an embodiment, the driving circuit may control the third coil 223 together with the second coil 222 to move the lens assembly 210 in a direction opposite to the second direction 20. For example, when the driving circuit controls the third coil 223 together with the second coil 222 to move the lens assembly 210 in the −x-axis direction and the −y-axis direction, the lens assembly 210 may be moved in a direction opposite to the second direction 20, and the fixing structure 230 may be moved in a direction 15 opposite to the first direction 10.

According to an embodiment, in operation 705, the one end 431 of the fixing structure 230 may be separated from the opening 245.

According to an embodiment, in operation 707, the driving circuit may control the first coil 221 to output a signal for moving the lens assembly 210 to the first position 210a.

According to an embodiment, in operation 709, the driving circuit may determine whether or not the lens assembly 210 has moved to the first position 210a using the Hall sensor 429. In an embodiment, when the lens assembly 210 has not moved to the first position 210a, the driving circuit may determine that the lens assembly 210 is in a fixed state and may perform operation 703 again. In another embodiment, when the lens assembly 210 has moved to the first position 210a, the driving circuit may determine that the lens assembly 210 is in a non-fixed state and may activate the camera module 180.

Operations 703 to 709 according to an embodiment will be described later with reference to FIGS. 8 to 9.

Figure 8:
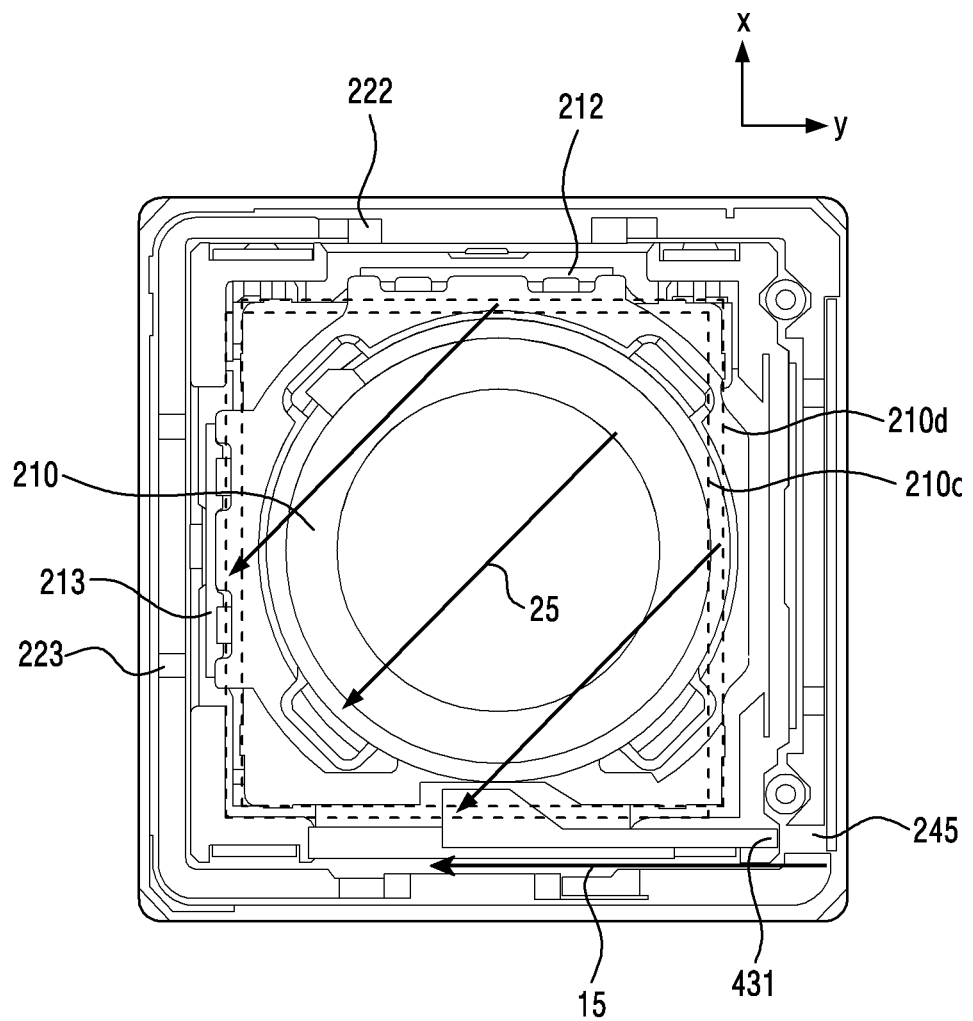
FIG. 8 illustrates a lens assembly moving in a direction opposite to the second direction according to an embodiment of the disclosure.

FIG. 8 illustrates the lens assembly 210 moving in a direction 25 opposite to the second direction according to an embodiment of the disclosure.

Figure 9:
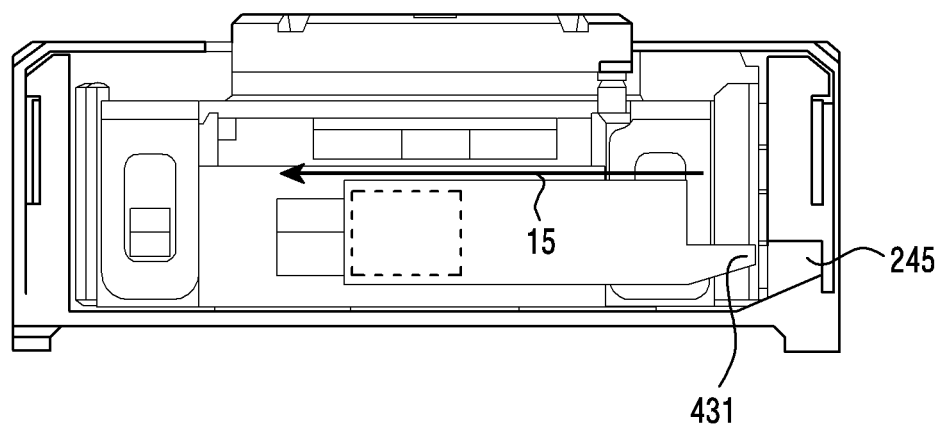
FIG. 9 illustrates a fixing structure separated from an opening according to an embodiment of the disclosure.

FIG. 9 illustrates the fixing structure 230 separated from the opening 245 according to an embodiment of the disclosure.

According to an embodiment, the driving circuit may control the second coil 222 to move the lens assembly 210 in a direction 25 opposite to the second direction. In an embodiment, the driving circuit may control the third coil 223 together with the second coil 222 to move the lens assembly 210 in the direction 25 opposite to the second direction. According to an embodiment, the lens assembly 210 may be moved in the direction 25 opposite to the second direction based on the interaction between the second coil 222 and the second magnet 212 and/or the interaction between the third coil 223 and the third magnet 213.

According to an embodiment, the lens assembly 210 may be moved from the position indicated by reference number 210d to the position indicated by reference number 210c under the control of the driving circuit.

According to an embodiment, when the lens assembly 210 moves in the direction 25 opposite to the second direction, the fixing structure 230 may be moved in a direction 15 opposite to the first direction by the protrusion 532, which is in contact with the recess 515.

According to an embodiment, when the fixing structure 230 moves in the direction 15 opposite to the first direction, the one end 431 of the fixing structure 230 may be separated from the opening 245.

According to an embodiment, when the one end 431 of the fixing structure 230 is separated from the opening 245, the lens assembly 210 may not be fixed in the optical axis direction or on a plane perpendicular to the optical axis direction.

Referring to FIGS. 7 to 9, when the driving circuit controls the second coil 222 to move the lens assembly 210 in the direction 25 opposite to the second direction in operation 703, the one end 431 of the fixing structure 230 may be separated from the opening 245 as in operation 705. When the one end 431 of the fixing structure 230 is separated from the opening 245, the lens assembly 210 may not be fixed to the housing 240.

According to an embodiment, in operation 707, when the driving circuit controls the first coil 221 to output a signal for moving the lens assembly 210 to the first position 210*a*, the lens assembly 210 may be moved to the first position 210*a* since the fixed structure 230 and the lens assembly 210 (or the AF carrier 219) are not fixed in the optical axis direction (e.g., the z-axis direction) by the opening 245.

According to an embodiment, in operation 709, the driving circuit may determine whether or not the lens assembly 210 has moved to the first position 210*a* using the Hall sensor 429. For example, when the one end 431 of the fixing structure 230 is separated from the opening 245, the lens assembly 210 may be moved to the first position 210*a*. As another example, when the one end 431 of the fixing structure 230 is not separated from the opening 245, the lens assembly 210 may be in the state of being fixed at the second position 210*b*. According to an embodiment, the driving circuit may detect the position of the lens assembly 210 using the Hall sensor 429.

An electronic device according to an embodiment of the disclosure may include a camera module, wherein the camera module may include a lens assembly including lenses aligned along an optical axis, an actuator surrounding at least two surfaces of the lens assembly, a first magnet disposed on a first surface of the lens assembly, a first coil disposed on the actuator to correspond to the first surface of the lens assembly and configured to move the lens assembly along the optical axis, a metal shield structure disposed on an outer surface of the actuator to face the first coil, a second magnet disposed on a second surface of the lens assembly, a second coil disposed on the actuator to correspond to the second surface of the lens assembly and configured to move the lens assembly on a plane perpendicular to the optical axis, a fixing structure disposed on a third surface perpendicular to the first surface of the lens assembly, wherein at least a portion of the fixing structure has a magnetic property, at least one driving circuit electrically connected to the first coil and the second coil, and a housing in which the lens assembly and the actuator are accommodated. The fixed structure may be movable in a first direction parallel to the third surface in a plane perpendicular to the optical axis, the housing may include an opening through which one end of the fixing structure is inserted into the housing, and when one end of the fixing structure is inserted into the opening, the fixing structure may be fixed in an optical axis direction by the opening and may be fixed in the first direction by a magnetic force acting on the metal shield structure.

In the electronic device according to an embodiment of the disclosure, the third surface of the lens assembly may include an inwardly concave recess, the other end of the fixing structure may include a protrusion corresponding to the recess, and when the one end of the fixing structure is inserted into the opening as the fixing structure moves in the first direction, the protrusion may come into contact with one end of the recess.

In the electronic device according to an embodiment of the disclosure, the opening may be included in a first side surface corresponding to the first surface of the lens assembly among inner surfaces of the housing, when the lens assembly is located at a first position with respect to the housing, the one end of the fixing structure may be in contact with the first side surface, and when the lens assembly is located at a second position shifted in the optical axis direction more than the first position relative to the housing, the fixing structure may move in the first direction relative to the lens assembly, and the one end of the fixing structure may be inserted into the opening.

In the electronic device according to an embodiment of the disclosure, when the camera module satisfies a predetermined condition, the driving circuit may control the first coil to move the lens assembly to the second position.

An electronic device according to an embodiment of the disclosure may further include a Hall sensor disposed on the actuator to face the first magnet and configured to detect a position of the lens assembly. The driving circuit may be configured to control the first coil to output a signal for moving the lens assembly to the first position, and to determine whether or not the lens assembly is fixed to the second position without being moved to the first position using the Hall sensor.

In the electronic device according to an embodiment of the disclosure, the angle between the third surface and a surface in which the one end of the recess and the protrusion are in contact with each other is an angle of 45 degrees, and when the one end of the fixing structure is inserted into the opening, the lens assembly may be fixed in a second direction perpendicular to the surface in which the one end of the recess and the protrusion are in contact with each other on a plane perpendicular to the optical axis by contact with the protrusion.

In the electronic device according to an embodiment of the disclosure, the driving circuit may be configured to control the second coil to move the lens assembly in a direction opposite to the second direction when the camera module satisfies a predetermined condition.

In the electronic device according to an embodiment of the disclosure, when the lens assembly moves in a direction opposite to the second direction, the one end of the fixing structure may be separated from the opening.

In the electronic device according to an embodiment of the disclosure, the camera module may further include an AF carrier that accommodates the lens assembly and is accommodated in the housing, wherein the fixing structure may be disposed on the AF carrier and may be movable in the first direction with respect to the AF carrier, and when the one end of the fixing structure is inserted into the opening, the AF carrier may be fixed in the optical axis direction by the opening, and the lens assembly may be fixed on the plane perpendicular to the optical axis as the protrusion comes into contact with the one end of the recess.

In the electronic device according to an embodiment of the disclosure, the one end of the fixing structure may have a magnetic property.

In the electronic device according to an embodiment of the disclosure, the entirety of the fixing structure may have a magnetic property.

In the electronic device according to an embodiment of the disclosure, the actuator may surround three surfaces including the first surface, the second surface, and the fourth surface of the lens assembly, the camera module may further include a third magnet disposed on the fourth surface of the lens assembly, and a third coil disposed on the actuator to correspond to the fourth surface. The driving circuit may be configured to control the third coil to move the lens assembly on the plane perpendicular to the optical axis along a first axis parallel to the second surface, and to control the second coil to move the lens assembly on the plane perpendicular to the optical axis along a second axis parallel to the fourth surface.

In the electronic device according to an embodiment of the disclosure, the camera module may include at least two balls disposed between the actuator and the lens assembly to move the lens assembly along the optical axis.

In the electronic device according to an embodiment of the disclosure, the camera module may include at least four balls disposed between the housing and the lens assembly to move the lens assembly on the plane perpendicular to the optical axis.

The electronic device according to an embodiment of the disclosure may further include an application processor (AP) electrically connected to the camera module. The AP may be configured to control the camera module to fix the lens assembly relative to the housing.

An electronic device according to an embodiment of the disclosure may include a camera module, wherein the camera module may include a lens assembly including lenses aligned along an optical axis, an actuator surrounding at least two surfaces of the lens assembly, a first magnet disposed on a first surface of the lens assembly, a first coil disposed on the actuator to correspond to the first surface of the lens assembly and configured to move the lens assembly along the optical axis, a metal shield structure disposed on an outer surface of the actuator to face the first coil, a second magnet disposed on a second surface of the lens assembly, a second coil disposed on the actuator to correspond to the second surface of the lens assembly and configured to move the lens assembly on a plane perpendicular to the optical axis, a fixing structure disposed on a third surface perpendicular to the first surface of the lens assembly, wherein at least a portion of the fixing structure has a magnetic property, at least one driving circuit electrically connected to the first coil and the second coil, and a housing in which the lens assembly and the actuator are accommodated. The fixed structure may be movable in a first direction parallel to the third surface in a plane perpendicular to the optical axis, the housing may include an opening through which one end of the fixing structure is inserted into the housing, the third surface of the lens assembly may include an inwardly concave recess, the other end of the fixing structure may include a protrusion corresponding to the recess, and when one end of the fixing structure is inserted into the opening, the fixing structure may be fixed in an optical axis direction by the opening, and may be fixed in the first direction by a magnetic force acting on the metal shield structure, and the protrusion may come into contact with one end of the recess.

In the electronic device according to an embodiment of the disclosure, when the fixing structure is inserted into the opening, the lens assembly may be fixed in a second direction perpendicular to the surface in which the one end of the recess and the protrusion are in contact with each other on the plane perpendicular to the optical axis by contact between the one end of the recess and the protrusion.

In the electronic device according to an embodiment of the disclosure, when the driving circuit controls the first coil to move the lens assembly to a predetermined position, the fixing structure may move in the first direction relative to the lens assembly, and the one end of the fixing structure may be inserted into the opening.

In the electronic device according to an embodiment of the disclosure, when the driving circuit controls the second coil to move the lens assembly in a direction opposite to the second direction, one end of the fixing structure may be separated from the opening.

In the electronic device according to an embodiment of the disclosure, the driving circuit may be configured to control the first coil to determine whether or not the one end of the fixing structure is inserted into the opening.

Figure 10:
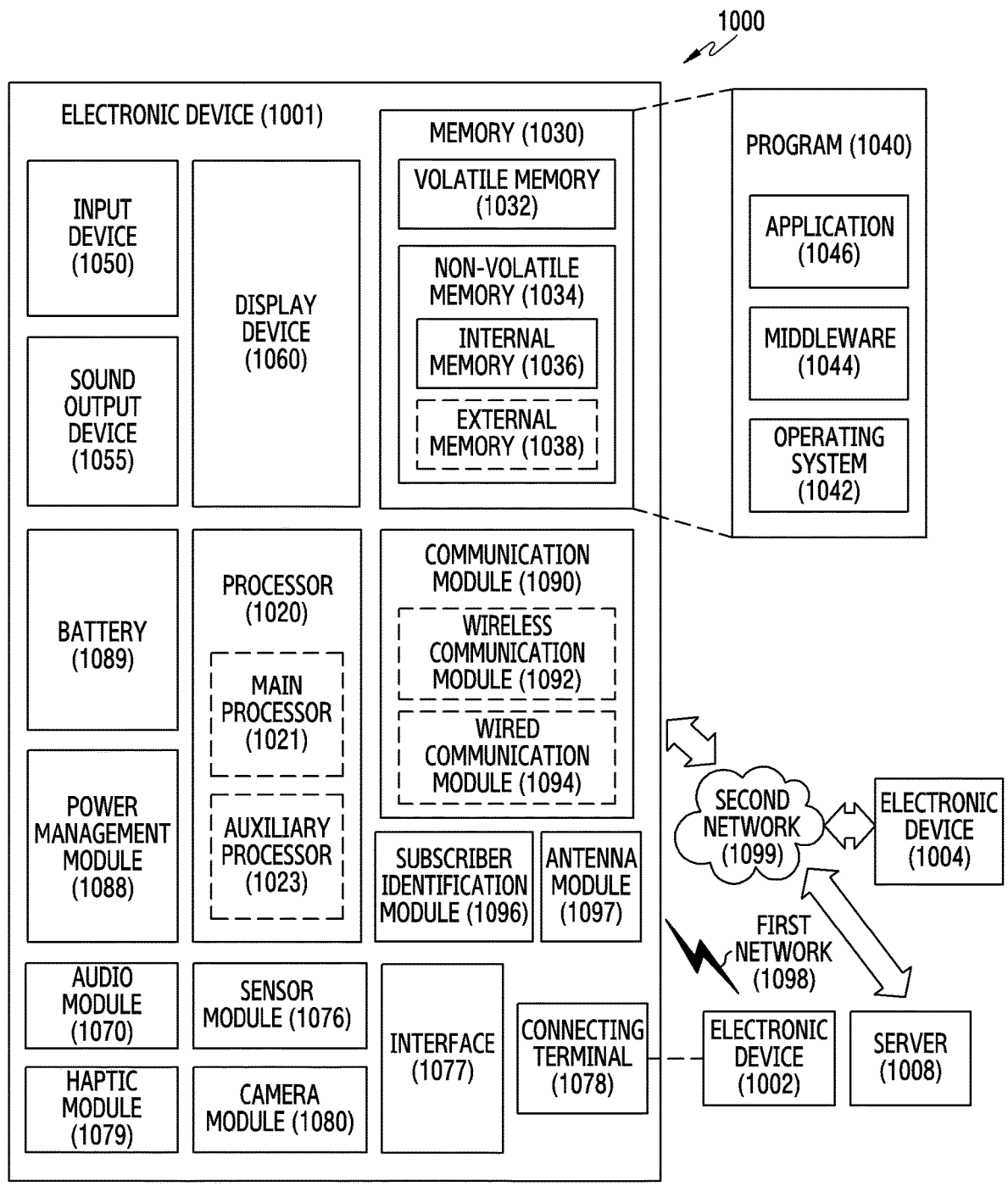
FIG. 10 is a block diagram of an electronic device in a network environment according to an embodiment of the disclosure.

FIG. 10 is a block diagram illustrating an electronic device 1001 in a network environment 1000 according to an embodiment of the disclosure.

Referring to FIG. 10, the electronic device 1001 in the network environment 1000 may communicate with an electronic device 1002 via a first network 1098 (e.g., a short-range wireless communication network), or at least one of an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In some embodiments, at least one of the components (e.g., the connecting terminal 1078) may be omitted from the electronic device 1001, or one or more other components may be added in the electronic device 1001. In some embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to one embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020

(e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element composed of a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002 or 1004, or the server 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In another embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1040) including one or more instructions that are stored in a storage medium (e.g., internal memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 11:
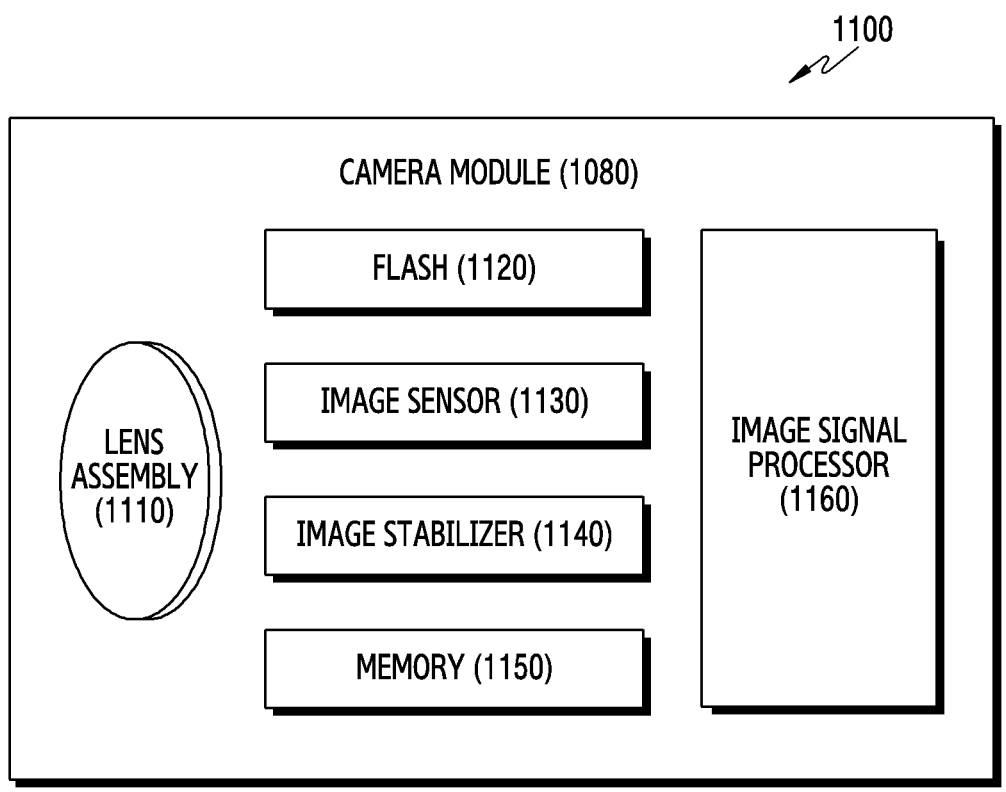
FIG. 11 is a block diagram exemplifying a camera module according to an embodiment of the disclosure.

FIG. 11 is a block diagram 1100 illustrating the camera module 1080 according to an embodiment of the disclosure.

Referring to FIG. 11, the camera module 1080 may include a lens assembly 1110, a flash 1120, an image sensor 1130, an image stabilizer 1140, memory 1150 (e.g., buffer memory), or an image signal processor 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more light emitting diodes (LEDs) (e.g., a red-green-blue (RGB) LED, a white LED, an infrared (IR) LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a charged coupled device (CCD) sensor or a complementary metal oxide semiconductor (CMOS) sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayer-patterned image, a high-resolution image) may be stored in the memory 1150, and its corresponding copy image (e.g., a low-resolution image) may be previewed via the display module 1060. Thereafter, if a specified condition is met (e.g., by a user's input or system command), at least part of the raw image stored in the memory 1150 may be obtained and processed, for example, by the image signal processor 1160. According to an embodiment, the memory 1150 may be configured as at least part of the memory 1030 or as a separate memory that is operated independently from the memory 1030.

The image signal processor 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1160 may perform control (e.g., exposure time control or read-out timing control) with respect to at least one (e.g., the image sensor 1130) of the components included in the camera module 1080. An image processed by the image signal processor 1160 may be stored back in the memory 1150 for further processing, or may be provided to an external component (e.g., the memory 1030, the display module 1060, the electronic device 1002, the electronic device 1004, or the server 1008) outside the camera module 1080. According to an embodiment, the image signal processor 1160 may be configured as at least part of the processor 1020, or as a separate processor that is operated independently from the processor 1020. If the image signal processor 1160 is configured as a separate processor from the processor 1020, at least one image processed by the image signal processor 1160 may be displayed, by the processor 1020, via the display module 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a camera module, wherein the camera module comprises:
     a lens assembly including lenses aligned along an optical axis;
     an actuator surrounding at least two surfaces of the lens assembly;
     a first magnet disposed on a first surface of the lens assembly;
     a first coil disposed on the actuator to correspond to the first surface of the lens assembly and configured to move the lens assembly along the optical axis;
     a metal shield structure disposed on an outer surface of the actuator to face the first coil;
     a second magnet disposed on a second surface of the lens assembly;
     a second coil disposed on the actuator to correspond to the second surface of the lens assembly and configured to move the lens assembly on a plane perpendicular to the optical axis;
     a fixing structure disposed on a third surface perpendicular to the first surface of the lens assembly, wherein at least a portion of the fixing structure has a magnetic property;
     at least one driving circuit electrically connected to the first coil and the second coil; and
     a housing in which the lens assembly and the actuator are accommodated,
   wherein the fixing structure is movable in a first direction parallel to the third surface in a plane perpendicular to the optical axis,
   wherein the housing includes an opening through which one end of the fixing structure is inserted into the housing, and
   wherein, when one end of the fixing structure is inserted into the opening, the fixing structure is fixed in an optical axis direction by the opening and is fixed in the first direction by a magnetic force acting on the metal shield structure.

2. The electronic device of claim 1,
   wherein the third surface of the lens assembly includes an inwardly concave recess,
   wherein another end of the fixing structure includes a protrusion corresponding to the recess, and
   wherein when the one end of the fixing structure is inserted into the opening as the fixing structure moves in the first direction, the protrusion comes into contact with one end of the recess.

3. The electronic device of claim 2,
   wherein the opening is included in a first side surface corresponding to the first surface of the lens assembly among inner surfaces of the housing,
   wherein, when the lens assembly is located at a first position with respect to the housing, the one end of the fixing structure is in contact with the first side surface, and
   wherein, when the lens assembly is located at a second position shifted in the optical axis direction more than the first position relative to the housing, the fixing structure moves in the first direction relative to the lens assembly, and the one end of the fixing structure is inserted into the opening.

4. The electronic device of claim 3, wherein, when the camera module satisfies a predetermined condition, the at least one driving circuit controls the first coil to move the lens assembly to the second position.

5. The electronic device of claim 4, further comprising:
a Hall sensor disposed on the actuator to face the first magnet and configured to detect a position of the lens assembly,
wherein the at least one driving circuit is configured to:
control the first coil to output a signal for moving the lens assembly to the first position, and
determine whether or not the lens assembly is fixed to the second position without being moved to the first position using the Hall sensor.

6. The electronic device of claim 2,
wherein an angle between the third surface and a surface in which the one end of the recess and the protrusion are in contact with each other is an angle of 45 degrees, and
wherein, when the one end of the fixing structure is inserted into the opening, the lens assembly is fixed in a second direction perpendicular to the surface in which the one end of the recess and the protrusion are in contact with each other on the plane perpendicular to the optical axis by contact between the one end of the recess and the protrusion.

7. The electronic device of claim 6, wherein the at least one driving circuit is configured to control the second coil to move the lens assembly in a direction opposite to the second direction when the camera module satisfies a predetermined condition.

8. The electronic device of claim 7, wherein, when the lens assembly moves in a direction opposite to the second direction, the one end of the fixing structure is separated from the opening.

9. The electronic device of claim 2,
wherein the camera module further includes an auto focus (AF) carrier that accommodates the lens assembly and is accommodated in the housing,
wherein the fixing structure is disposed on the AF carrier and configured to be movable in the first direction relative to the AF carrier, and
wherein, when the one end of the fixing structure is inserted into the opening, the AF carrier is fixed in the optical axis direction by the opening, and the lens assembly is fixed on the plane perpendicular to the optical axis as the protrusion comes into contact with the one end of the recess.

10. The electronic device of claim 1, wherein the one end of the fixing structure has a magnetic property.

11. The electronic device of claim 1, wherein an entirety of the fixing structure has a magnetic property.

12. The electronic device of claim 1,
wherein the actuator surrounds three surfaces including the first surface, the second surface, and a fourth surface of the lens assembly,
wherein the camera module further includes a third magnet disposed on the fourth surface of the lens assembly, and a third coil disposed on the actuator to correspond to the fourth surface, and
wherein the at least one driving circuit is configured to:
control the third coil to move the lens assembly on the plane perpendicular to the optical axis along a first axis parallel to the second surface, and
control the second coil to move the lens assembly on the plane perpendicular to the optical axis along a second axis parallel to the fourth surface.

13. The electronic device of claim 1, wherein the camera module includes at least two balls disposed between the actuator and the lens assembly to move the lens assembly along the optical axis.

14. The electronic device of claim 1, wherein the camera module includes at least four balls disposed between the housing and the lens assembly to move the lens assembly on the plane perpendicular to the optical axis.

15. The electronic device of claim 1, further comprising:
an application processor (AP) electrically connected to the camera module,
wherein the AP is configured to control the camera module to fix the lens assembly relative to the housing.

16. An electronic device comprising:
a camera module, wherein the camera module comprises:
a lens assembly including lenses aligned along an optical axis,
an actuator surrounding at least two surfaces of the lens assembly,
a first magnet disposed on a first surface of the lens assembly,
a first coil disposed on the actuator to correspond to the first surface of the lens assembly and configured to move the lens assembly along the optical axis,
a metal shield structure disposed on an outer surface of the actuator to face the first coil,
a second magnet disposed on a second surface of the lens assembly,
a second coil disposed on the actuator to correspond to the second surface of the lens assembly and configured to move the lens assembly on a plane perpendicular to the optical axis,
a fixing structure disposed on a third surface perpendicular to the first surface of the lens assembly, wherein at least a portion of the fixing structure has a magnetic property,
at least one driving circuit electrically connected to the first coil and the second coil, and
a housing in which the lens assembly and the actuator are accommodated,
wherein the fixing structure is movable in a first direction parallel to the third surface in a plane perpendicular to the optical axis,
wherein the housing includes an opening through which one end of the fixing structure is inserted into the housing,
wherein the third surface of the lens assembly includes an inwardly concave recess,
wherein another end of the fixing structure includes a protrusion corresponding to the recess, and
wherein, when one end of the fixing structure is inserted into the opening, the fixing structure is fixed in an optical axis direction by the opening, and is fixed in the first direction by a magnetic force acting on the metal shield structure, and the protrusion comes into contact with one end of the recess.

17. The electronic device of claim 16, wherein, when the fixing structure is inserted into the opening, the lens assembly is fixed in a second direction perpendicular to a surface in which the one end of the recess and the protrusion are in contact with each other on the plane perpendicular to the optical axis by contact between the one end of the recess and the protrusion.

18. The electronic device of claim 17, wherein, when the at least one driving circuit controls the first coil to move the lens assembly to a predetermined position, the fixing structure moves in the first direction relative to the lens assembly, and the one end of the fixing structure is inserted into the opening.

19. The electronic device of claim 4, wherein the predetermined condition comprises a case in which fixing the lens assembly is necessary.

20. The electronic device of claim 4, wherein the predetermined condition comprises receiving, by the camera module, a signal to deactivate the camera module.

* * * * *